April 2, 1957  W. H. KEITER  2,787,077
TROLLING DEVICE
Filed April 21, 1955
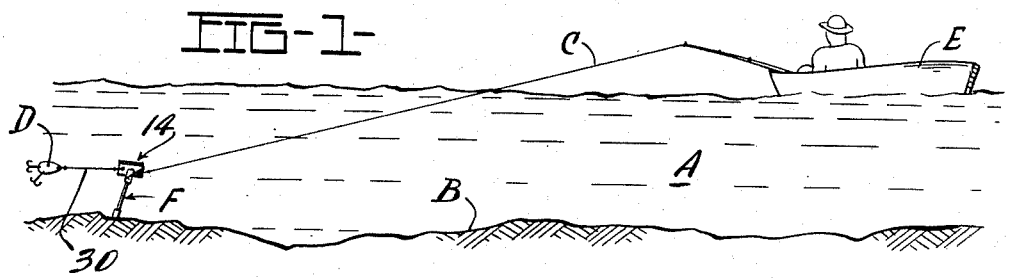
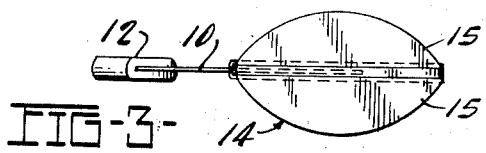
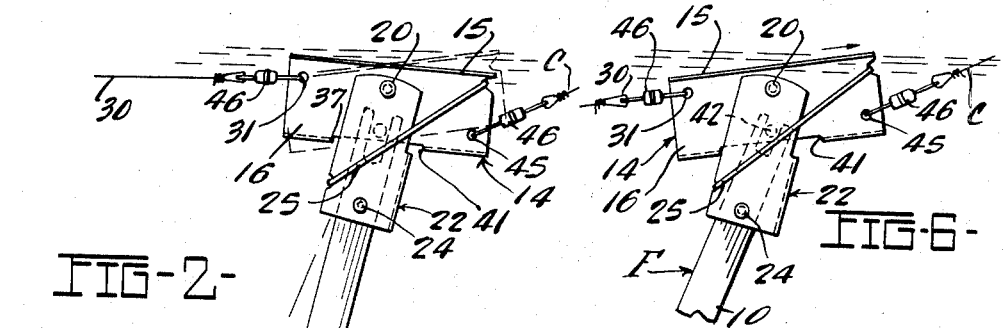
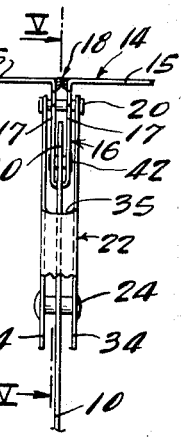
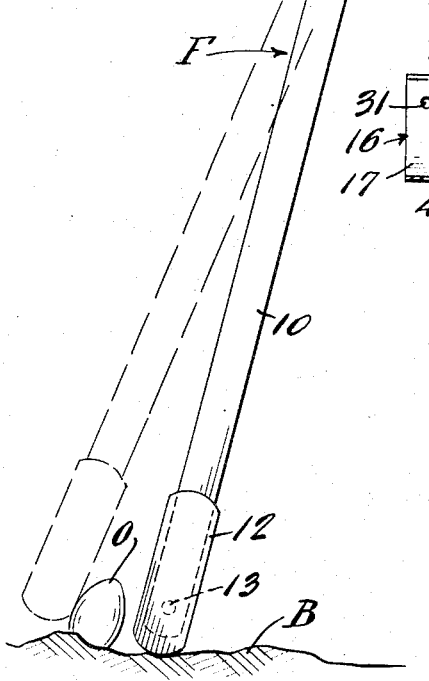
INVENTOR:
WILLIAM H. KEITER
BY
ATTY.

United States Patent Office 2,787,077
Patented Apr. 2, 1957

2,787,077

TROLLING DEVICE

William H. Keiter, Toledo, Ohio

Application April 21, 1955, Serial No. 502,960

18 Claims. (Cl. 43—43.13)

This invention relates to a device for controlling the depth of fishing lures when trolling.

An object of this invention is to provide a device which may be attached in a trolling line near the lure or bait and which will closely travel the ground contours of streams, rivers or lakes so that a lure may follow at a predetermined spaced distance from the bottom of the water being fished.

Another object is to provide such a device which will automatically tend to rise to the surface of the water during trolling when a fish has been caught by the lure.

Another object is to provide such a device which will automatically rise slightly in the water when it hits an obstacle or snag on the bottom so that it will not snag on rocks, sticks, logs, etc., but will glide smoothly over such obstacles while permitting the lure behind the device to follow without snagging on them.

Another object is to provide such a device of simple and light construction, economical manufacture, and efficient performance which can readily and beneficially be used during trolling.

Another object is to provide such a device which will quickly descend below the turbulence of the propellers or wake of the trolling boat although relatively light in weight, and accordingly use less line to get to and maintain its position at or near the bottom of the water being trolled.

With these and other objects in view, the invention comprises a rigid drag leg, bar, strip or feeler which may be weighted at its lower end, if desired, for following the bottom of the body of water being trolled, a hydrofoil or kite having a pair of fins or wings and being pivotly attached to the upper end of the feeler leg, a resilient tensioning means for positioning the hydrofoil and its wings relative to the leg so that the device will quickly descend to its position near the bottom of the body of water and maintain itself in such position, and means for causing the hydrofoil to rise or guide the device to the surface when a strain is applied to the tension means either by the pull on the lure by the catching of the fish or by the contact of the lower end of the leg with an obstacle on the bottom. The connection between the upper end of the leg and the winged hydrofoil may be accomplished by means of a link pivoted to both the kite and near the upper end of the leg, and includes a camming action between the upper end of the leg and means on the kite, so that the feeling of an obstruction on the bottom by the leg, which obstruction might snag the lure, will cause an upward tilting of the wings of the kite against the action of the tensioning means to raise the device in the water until the obstruction is cleared.

The above mentioned and other features and objects of this invention and the manner of attaining them will become more apparent and the invention itself will be best understood by reference to the following description of an embodiment of the invention taken in conjunction with the accompanying drawings, wherein:

Fig. 1 illustrates this invention as it is intended to be used in troll fishing;

Fig. 2 is an enlarged side elevation of the device of this invention showing in full lines the normal angular relationship of the parts of the device while in use as shown in Fig. 1, and in dotted lines the relative position taken by the parts when an obstacle is contacted on the bottom of the water being trolled;

Fig. 3 is a top plan view of the device shown in Fig. 2;

Fig. 4 is a further enlarged front elevation view of the upper part of the device shown in Fig. 2 with parts broken away;

Fig. 5 is a sectional view taken along line V—V of Fig. 4; and

Fig. 6 is a view of the upper portion of the device of Fig. 2 showing in full lines the angular position of the parts during surfacing or rising over a contacted obstacle on the bottom of the water being trolled.

With reference to Fig. 1, A denotes a body of water being fished, having a bottom B. A trolling line C and fishing lure D are drawn through the water by the fisherman in the propelled boat E floating on the surface of the water A. For purposes of controlling the depth at which the lure D is drawn, together with the purposes as mentioned herein, there is provided the device F of this invention at the end of the troll line C and spaced a few feet from the bait or lure D.

This device F comprises a rigid drag bar, strip, feeler or leg 10 having a weighted lower end 12 with a hydrofoil or kite unit 14 pivotly attached to its upper end. The leg 10 may comprise a flat strip, preferably with its narrow side or cutting edge toward its direction of motion in the water to offer as little resistance as possible, and a weighted lower end 12 that may be made of a heavy metal such as lead riveted or bolted to the leg 10, or cast thereon through and around an aperture 13 provided in the bottom of the metal strip 10 to anchor it to the strip. The strip 10 herein shown may be made of a rigid strap of non-corrosive sheet material, such as aluminum.

The hydrofoil or kite unit 14 may comprise a pair of outwardly extending wings or fins 15 which may be integral with its central vertically depending body portion 16. This central portion 16 (see Figs. 4 and 5) may comprise adjacent parallel spaced normally vertical portions 17 formed as upwardly extending sides of a U-bent piece of sheet material, such as of a non-corrosive metal as aluminum, coated iron, plastic material, or the like. The fins 15 may be outward extensions of the sides 17 and joined together by solder 18 at their adjacent edges. These fins may be of any desired shape or size to suit the particular trolling needs of speed of trolling, weight of the lure D and the weighted strip 10, and the like.

The hydrofoil unit 14 shown herein has its portion 16 connected by a pivot 20 to link member 22 attached by means of a second pivot 24 near the upper end of the strip 10. A resilient tension member such as a tension spring or a band of rubber 25 may be attached between notches 26 on the link and 27 on the kite (see Fig. 5) to maintain the relative position of the parts indicated in full lines in Fig. 2, namely, a downward tilted direction for the fins 15 with respect to the substantially vertical position of the strip 10, so as to normally urge and maintain the device F toward and near the bottom B of the water as the trolling line C is moved toward the right as viewed in Figs. 1 and 2. The tension in the means 25 may be varied by using different strength rubber bands or wrapping it once or more times around the link 22.

The strip 10 will accordingly just lightly drag over the bottom B being maintained in its substantially vertical position by the tension member 25, so that the lure line attached to the top of the device F will be substantially normally spaced a distance corresponding to the length of the bar 10 from the bottom B at all times. This distance usually is between about nine and twenty-four inches, and preferably about one foot. A lure attaching line 30 secures the lure D to the attaching means or hole 31 in the rear of the kite body portion 16, and consequently the lure will follow at a constant level in the water when being pulled, without dragging its hooks on the bottom or becoming snagged on objects on the bottom, depending of course on the length of the lure line 30, the weight of the lure, and the speed of trolling. Usually the length of this line is not over about three feet and usually about two and a half feet.

The link member 22 may comprise a pair of parallel rearwardly projecting side walls 34 formed by bending a piece of sheet material into a U-shape at 35. Between an upward extension of these side walls 34 the pivot 20 extends through the sides 17 of the kite portion 16, and below the pivot 20 between the link side wall 34 extends the pivot 24 for supporting the leg 10. The upper end of the leg 10 may have a bifurcated portion 40 which may extend through an aperture 41 in the bottom of the U-portion connecting the parallel sides 17 of the kite portion 16, and therebetween straddle a fixed pin 42 anchored to and bridging the side walls 17. This cooperation of the bifurcated portion 40 with the pin 42 provides a type of camming action for the relative movement of the leg 10 with that of the kite 14, so that when the leg 10 hits an obstacle O on the bottom B it will be moved into the dotted line position shown in Fig. 2 pivoting around the pivot 24 so as to push the pin 42 forwardly which in turn causes the kite 14 to pivot in the opposite direction around its pivot 20 to tilt its wings 15 upwardly (as shown in the dotted line position in Fig. 2 and in full lines in Fig. 6). If desired, the pivot cam pin 42 may be placed forwardly of the line between the pivots 22 and 24 to compensate for the normal dragging angle for the leg 10 shown in full line position in Fig. 2, so that the device will not raise as soon as the bottom of the leg 10 or weight 12 contacts the bottom B but only when it is pulled against an obstacle O. With the kite 14 then tilted slightly upwardly, its fins 15 will raise the device over the obstacle O and prevent any snagging or catching of the device or its trailing lure D on obstacle O which was just felt by the weighted lower end of the strip 10.

When a fish is caught on the lure D the leader line or wire 30 will exert a rearward pull on the kite portion 14 to which it is attached at 31 (see Fig. 6), which pull will cause the fins 15 to be inclined upwardly to the right under the influence of the couple formed also by the tension in the troll line C which is connected by a means such as an aperture 45 in the opposite or front and lower end of the portion 16 of the kite 14. This upward tilting action of the kite fins 15 when the pull of at catch exists on the line 30, is caused by the couple produced by the location of the aperture 45 for the troll line C farther below the fins 15 than the location of the aperture 31 for the lure line 30. If desired, a swivel 46 may be placed in the line C and/or in the lure line 30 adjacent the device F, or at the apertures 31 and/or 45 to prevent twisting of either the line C or 30 from affecting the normal vertical position of the device F in the water A.

The limited positions of the relative parts 10, 14 and 22 of the device corresponding respectively to the bar, kite and link, are provided by their relative shape and abutting engagement of their edges and corners such as the bottom of the U or edge 35 with the outside of the U or edge joining the bottom of the walls 17 (see Fig. 5), of the link 22 against the under side of the fins 15 and the edge of the leg 10 against the inside bottom of the U-edge 35 (see Fig. 5).

The whole or any part of the device F may be coated, painted or colored to blend with the bottom B or to attract fish, as well as to protect the parts from corrosion.

While there is described above the principles of this invention in connection with specific apparatus, it is to be clearly understood that this description is made only by way of an example and not as a limitation to the scope of this invention.

What is claimed is:

1. A device as described herein comprising: a tiltable hydrofoil unit having oppositely extending fins located in the same general plane, a drag leg depending from said unit, supporting means for said leg comprising an intermediately placed end pivoted link having limited pivotable connection to both said unit and said leg, tension means between said unit and said link to establish a predetermined relation to urge said device downwardly in the water, and separate spaced connection engaging means provided on said unit for attaching a lure and a trolling line thereto and being so positioned that an extraneous force applied to the lure line while force of pull is also applied to the troll line causes said fins to change their normal angle and assist the device to rise to the surface, and said leg being so connected to said link and said unit that contact of said leg with an obstacle along the bottom of the water being fished causes said fins also to change their normal angle and assist the device to rise over said obstacle.

2. A device according to claim 1 wherein said means for attaching said lines to said unit includes apertures at opposite ends of said unit so staggered that a line joining them is out of parallelism and alignment with said fins.

3. In a trolling device for fishing to keep a bait lure spaced substantially a given distance from the bottom of the water being fished, said device having troll and bait lines associated therewith and comprising: a kite, separate means to attach said troll and bait lines to opposite ends of said kite, an end pivoted link depending from said kite between said separate means, and a depending bottom spacing leg suspended from said link, means for pivotally connecting said link and said leg to the kite, means for tilting said kite in one direction when said leg hits an obstacle on said bottom, and means for normally maintaining said kite tilted in the opposite direction to keep said device at substantially the spacing of said leg from said bottom during trolling.

4. A device according to claim 3 wherein said kite comprises a pair of oppositely extending fins, and a centrally depending vertical portion.

5. A device according to claim 4 wherein said separate means to attach the troll and bait lines include separate holes in said vertical portion so staggered that a line joining them is out of parallelism with said fins.

6. A device according to claim 3 wherein said link means has separate pivotal connections to said kite and to said leg at opposite ends of said link said leg at opposite ends of said link.

7. A device according to claim 6 including means for limiting the pivotable movement of said link means, kite and leg around said pivotal connections.

8. A device according to claim 3 including a swivel between one of said lines and said separate means.

9. A device according to claim 3 wherein said leg has a lead weight anchored at its lower end.

10. A device according to claim 3 wherein said means for tilting said kite includes a cam means.

11. A device according to claim 10 wherein said cam means comprises a forked end on said leg and a cooperating pin mounted in said kite straddled by said forked end.

12. A device according to claim 11 wherein said cooperating pin mounted in said kite is out of alignment with said pivotal connections.

13. A device according to claim 3 wherein said means for normally maintaining said kite tilted in said opposite direction includes a resilient means connected between said kite and said link means.

14. A device according to claim 13 wherein said resilient means comprises a rubber band and separate seats therefor in said link means and said kite means, respectively.

15. A trolling device comprising: a kite, a positioning strip member for said kite, a link between said kite and said strip member, separate means for pivoting said link to said kite and said strip member near one end of said strip member, cam means between said kite and the adjacent end of said strip member for controlling the relative movement of said kite and said strip member, resilient means for normally urging said kite and said strip member in a given angular position with respect to each other to maintain said device near the bottom of a body of water being trolled, and separate means on opposite ends of said kite to attach a trolling line and a lure line thereto.

16. A trolling device for fishing to normally maintain a bait lure spaced substantially a given distance from the bottom of the water being fished, said device comprising: a tiltable hydrofoil unit having fixed fins, a drag leg depending from said unit, a pivotal supporting connection between the upper end of said leg and said unit, tension means between said unit and said leg to normally maintain said unit tilted in one direction with respect to said leg to urge said device downwardly in the water, and separate connecting means fixed on and at opposite ends of said unit for attaching respectively a lure and a trolling line thereto, said separate connecting means being so staggered that a line joining them is out of parallelism and alignment with said fin portion of said kite whereby an extraneous force applied to the lure line while a separate force of pull is applied to the troll line causes said fins to change their normal tilt in the water causing the device to rise to the surface, and whereby the contact of said leg with an obstacle along the bottom of the water applies a force against said tension means also to change the normal tilt of said fins causing the device to rise in the water until it has cleared the obstacle.

17. A trolling device for attachment to a fishing troll line to keep a bait lure attached thereto by a line spaced substantially a given distance from the bottom of the water being fished, said device comprising: a kite having a fixed fin portion, a bottom spacing leg depending from said kite, a pivotal connection for attaching said leg to said kite, separate means fixed to said kite to attach the troll and bait lines to opposite ends of said kite, a swivel between one of said lines and its corresponding separate means, and resilient means for normally urging said fin and said troll attaching means of said kite tilted in a downwardly direction with respect to the normal trolling movement of said device through the water whereby the weight of said leg and tilt of said fin, causes said device to descend toward the bottom of the water and to remain there unless a pull is exerted by a fish dragging on the bait line attached to said bait line attaching means, or an obstacle on the bottom is contacted by said leg to oppose the action of said resilient means whereby either of which conditions causes said fin portion to tilt upwardly in the direction of pull of said troll line to raise said device in the water.

18. A trolling device for attachment to a fishing line to keep a bait lure spaced substantially a given distance from the bottom of the water being fished, said device comprising: a kite having a fixed fin portion, a bottom spacing leg depending from said kite, a pivotal connection for attaching said leg to said kite, separate spaced connecting means fixed to said kite to attach a troll and a bait line to opposite ends of said kite, said separate connecting means being so staggered that a line joining them is out of parallelism and alignment with said fin portion of said kite, and resilient means for normally urging said fin and said troll attaching means of said kite in a position tilted in a downwardly direction with respect to the normal trolling movement of said device through the water, whereby the weight of said leg and tilt of said fin causes said device to descend toward the bottom of the water and to remain there unless a pull is exerted by a fish dragging on the bait line attached to said bait line attaching means, or an obstacle on the bottom is contacted by said leg to oppose the action of said resilient means, either of which conditions causes said fin portion to tilt upwardly in the direction of pull of said troll line to raise said device in the water.

References Cited in the file of this patent

UNITED STATES PATENTS

| | | |
|---|---|---|
| 2,542,347 | Muller | Feb. 20, 1951 |
| 2,645,053 | Moritz | July 14, 1953 |
| 2,648,929 | Dunn | Aug. 18, 1953 |